United States Patent Office 3,422,967
Patented Jan. 21, 1969

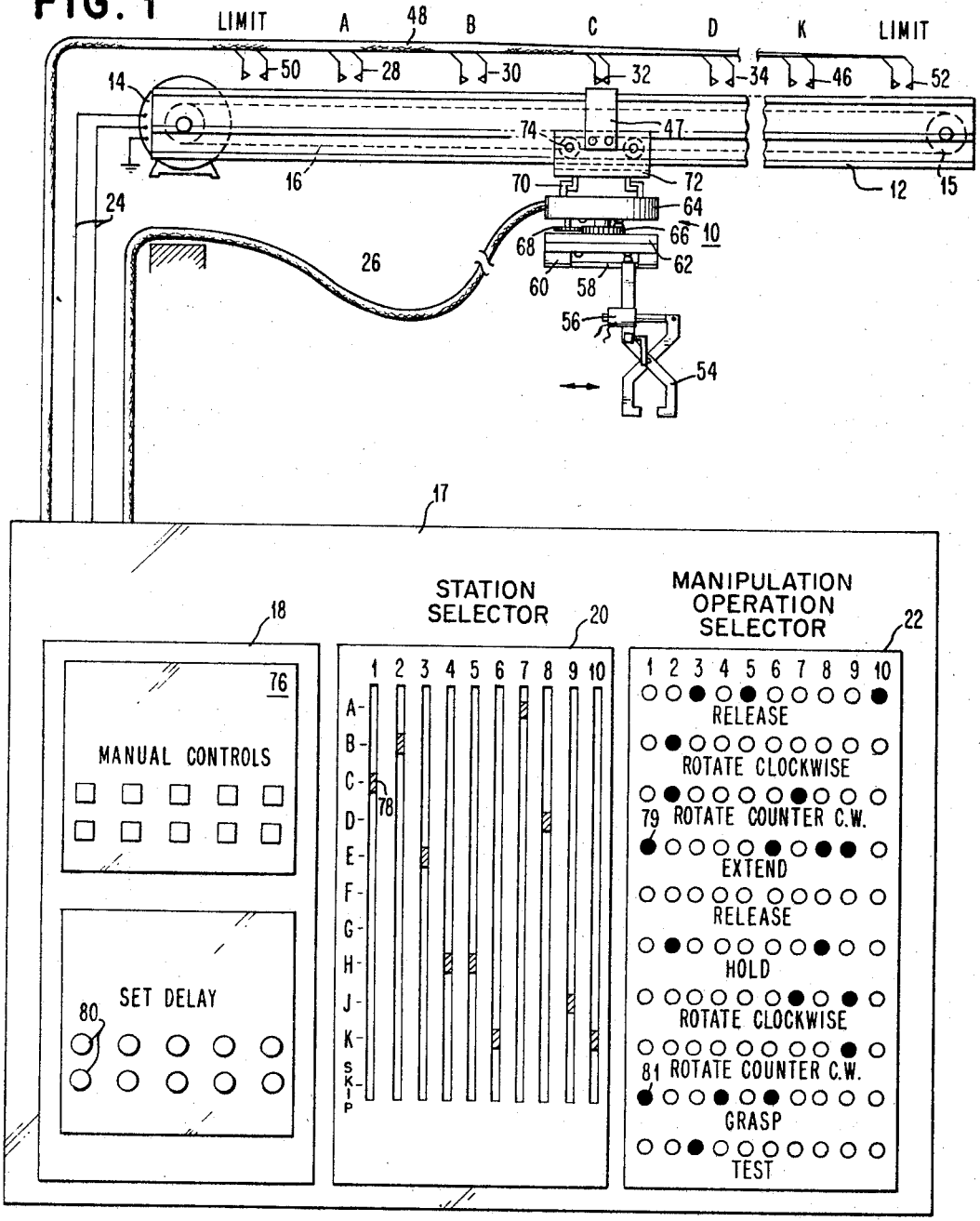

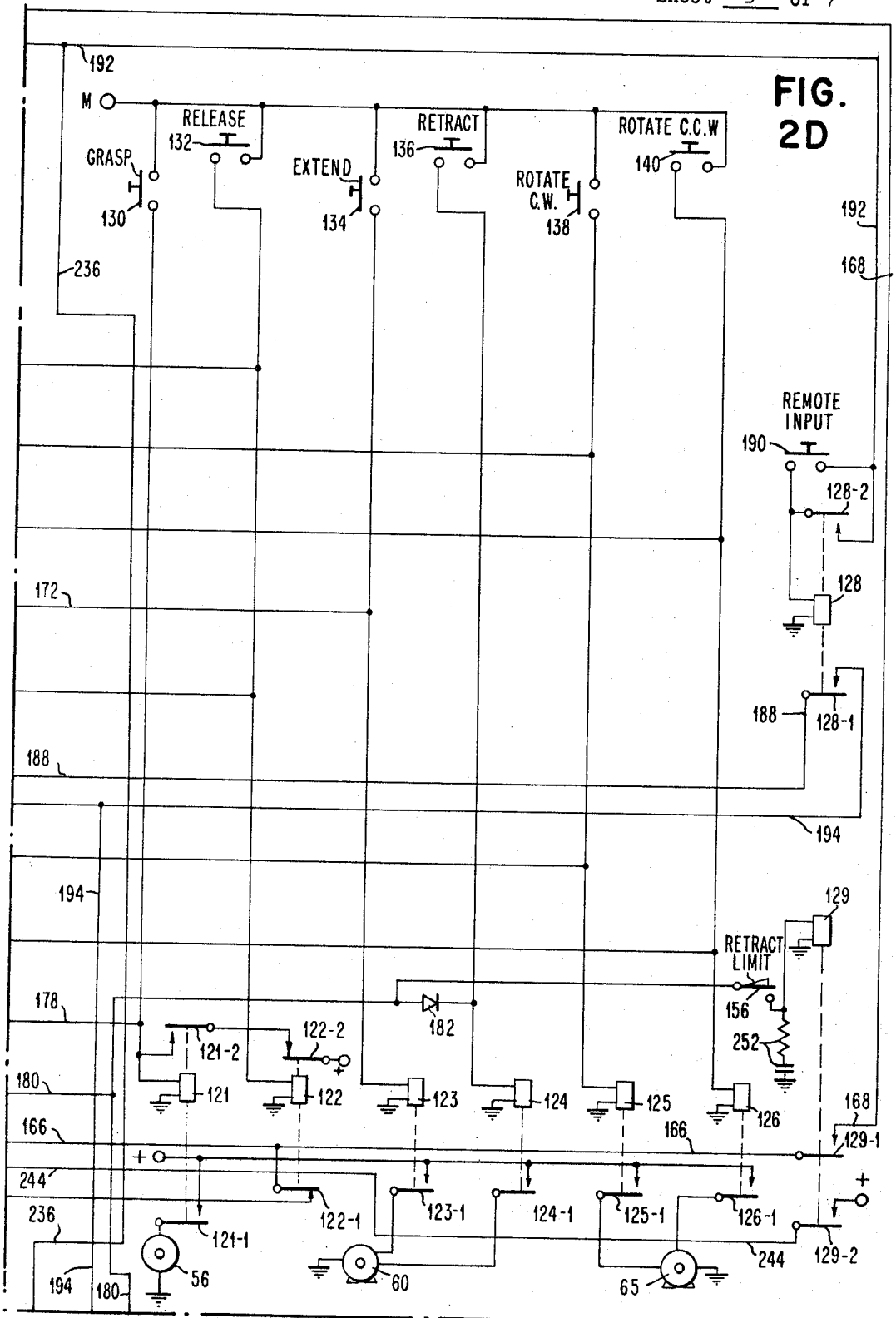

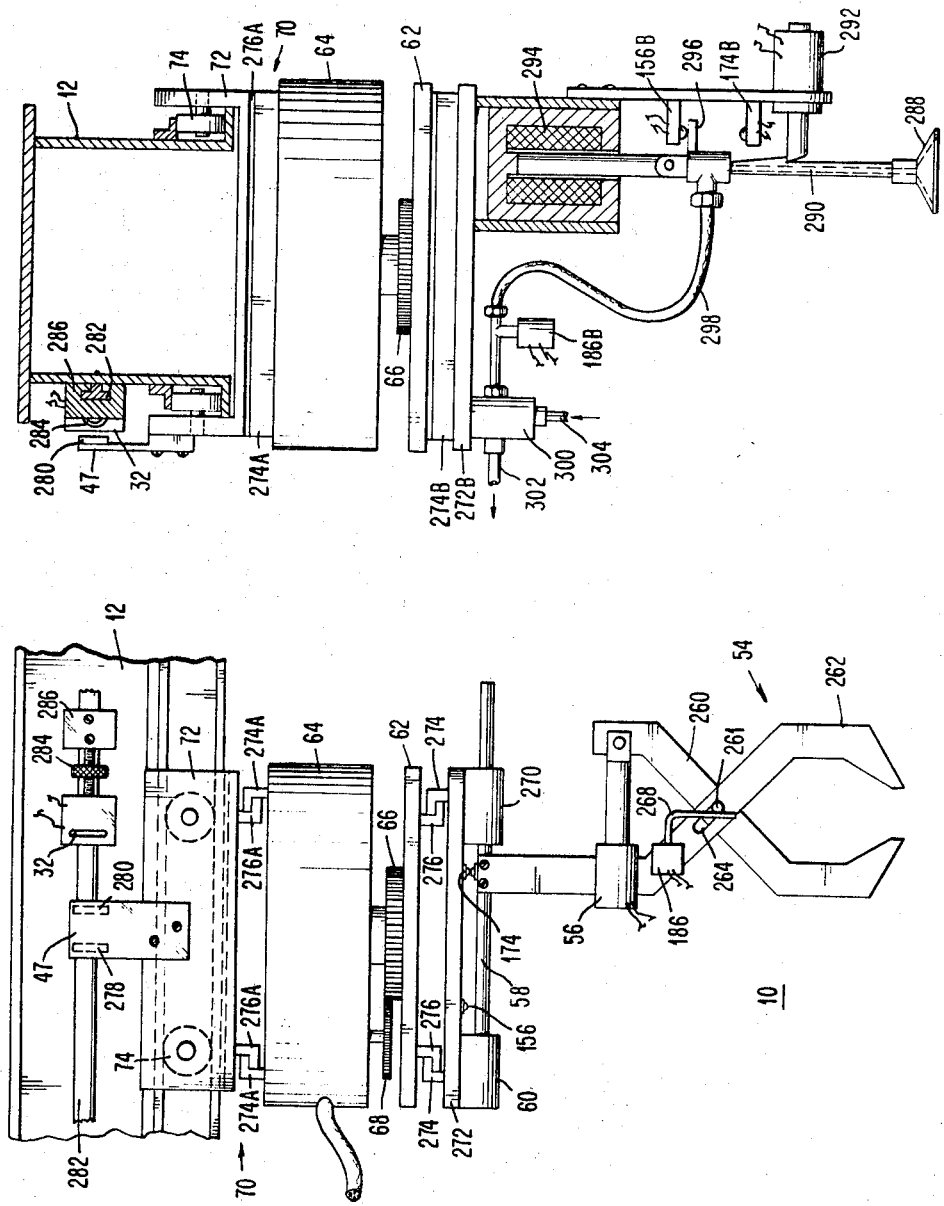

3,422,967
AUTOMATIC MANIPULATOR AND POSITIONING
SYSTEM
Peter A. Aron, Katonah, N.Y.
(22 E. Willow Tree Road, Spring Valley, N.Y. 10977)
Filed Oct. 24, 1965, Ser. No. 504,802
U.S. Cl. 214—1                                    18 Claims
Int. Cl. B25j 3/00; E04h 6/00; B23p 23/00

ABSTRACT OF THE DISCLOSURE

The system disclosed includes a manipulator 10 (FIG. 1) translationally movable along a track 12 to various selected stations A, B, C, where the presence of the manipulator is detected by switches such as switch 32. The system is operable in a series of steps, a station being selected for each step at the station selector 20. At each step one or more manipulations are performed as selected at the manipulation selector 22. After the performance of the selected manipulations, the system proceeds to the next step. The station detector switches 32 may be adjustably movable along the track 12 to provide infinite adjustment in individual station positions.

---

Figure 2A:
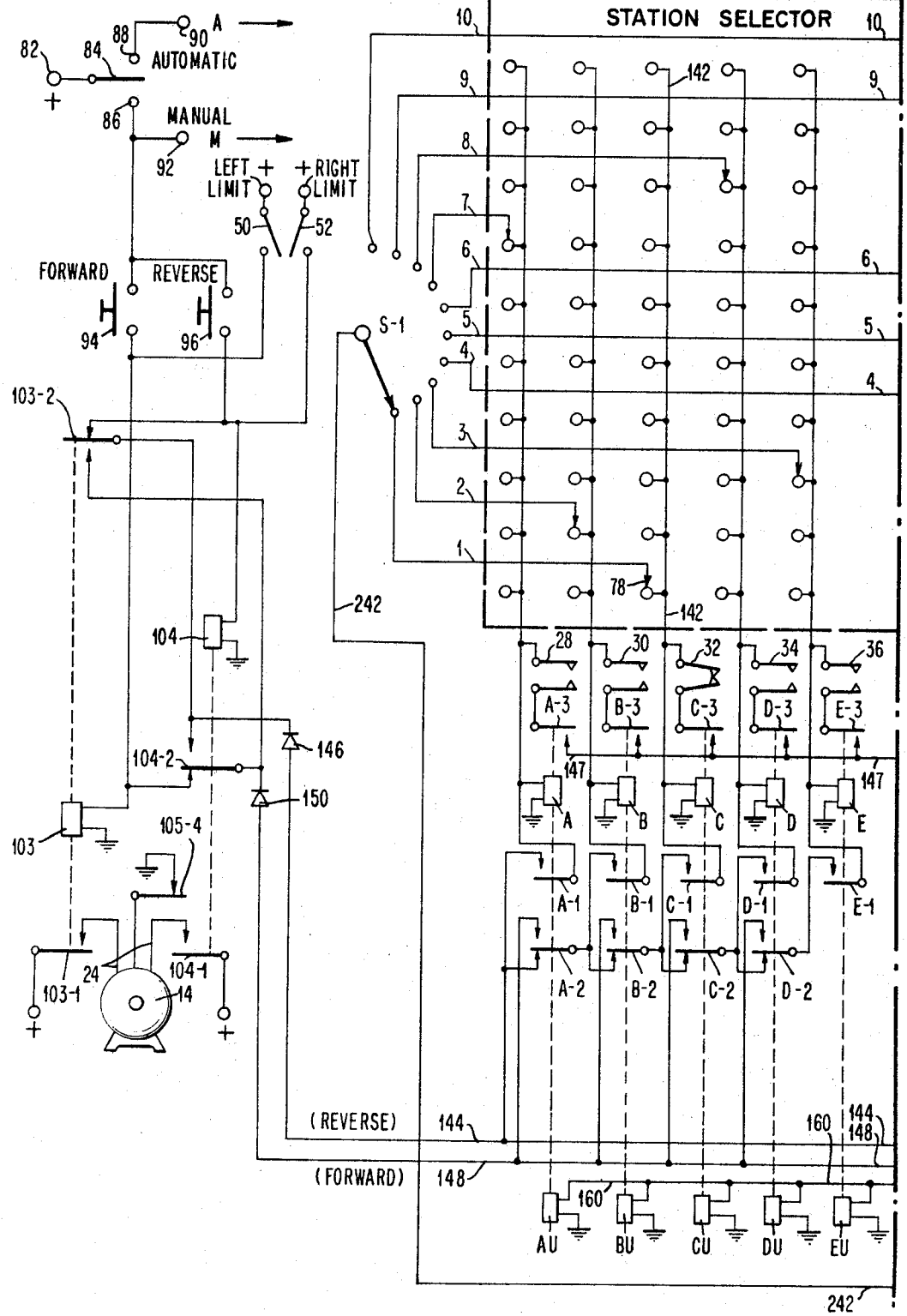
Figure 2B:
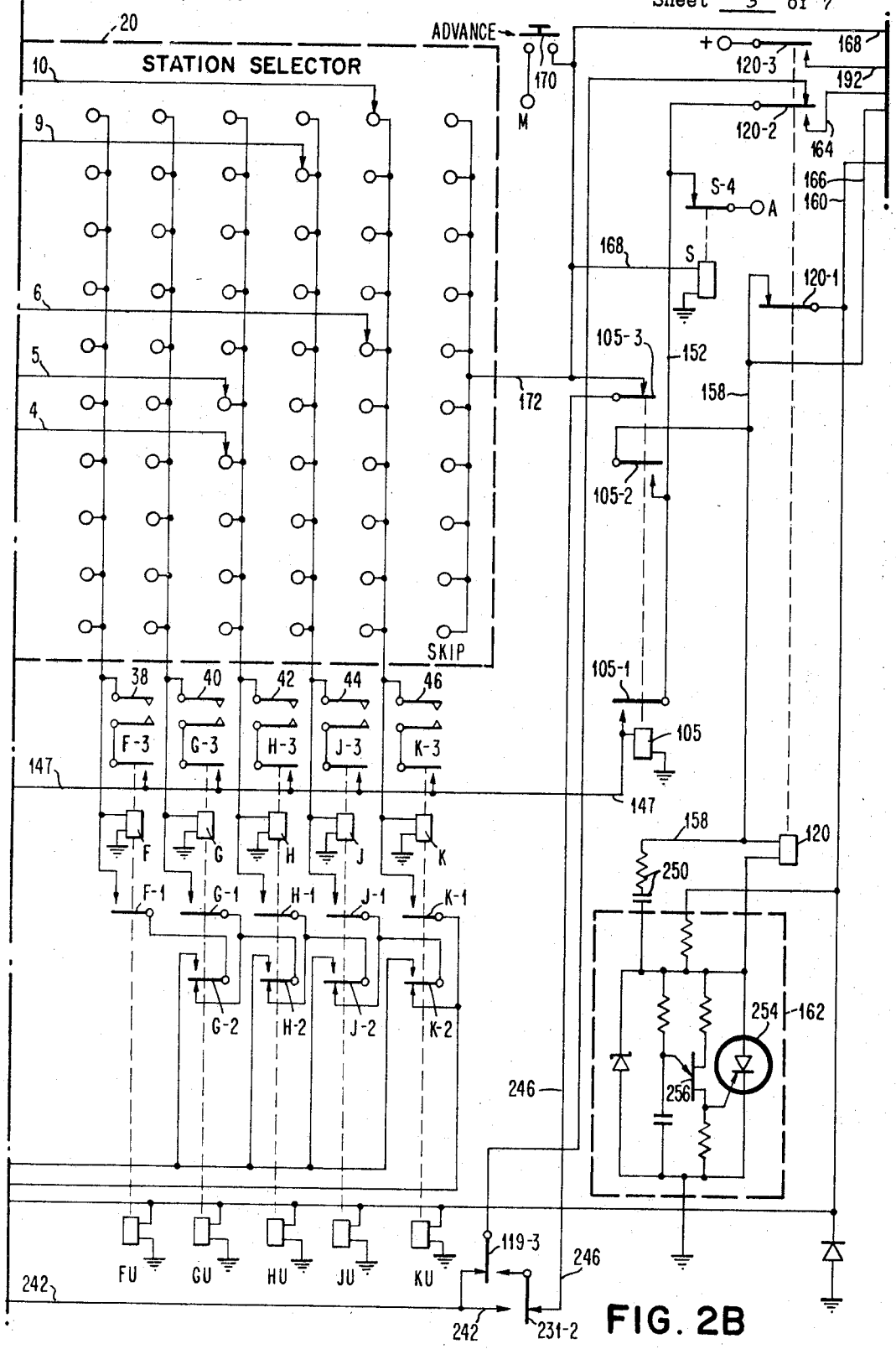
Figure 2C:
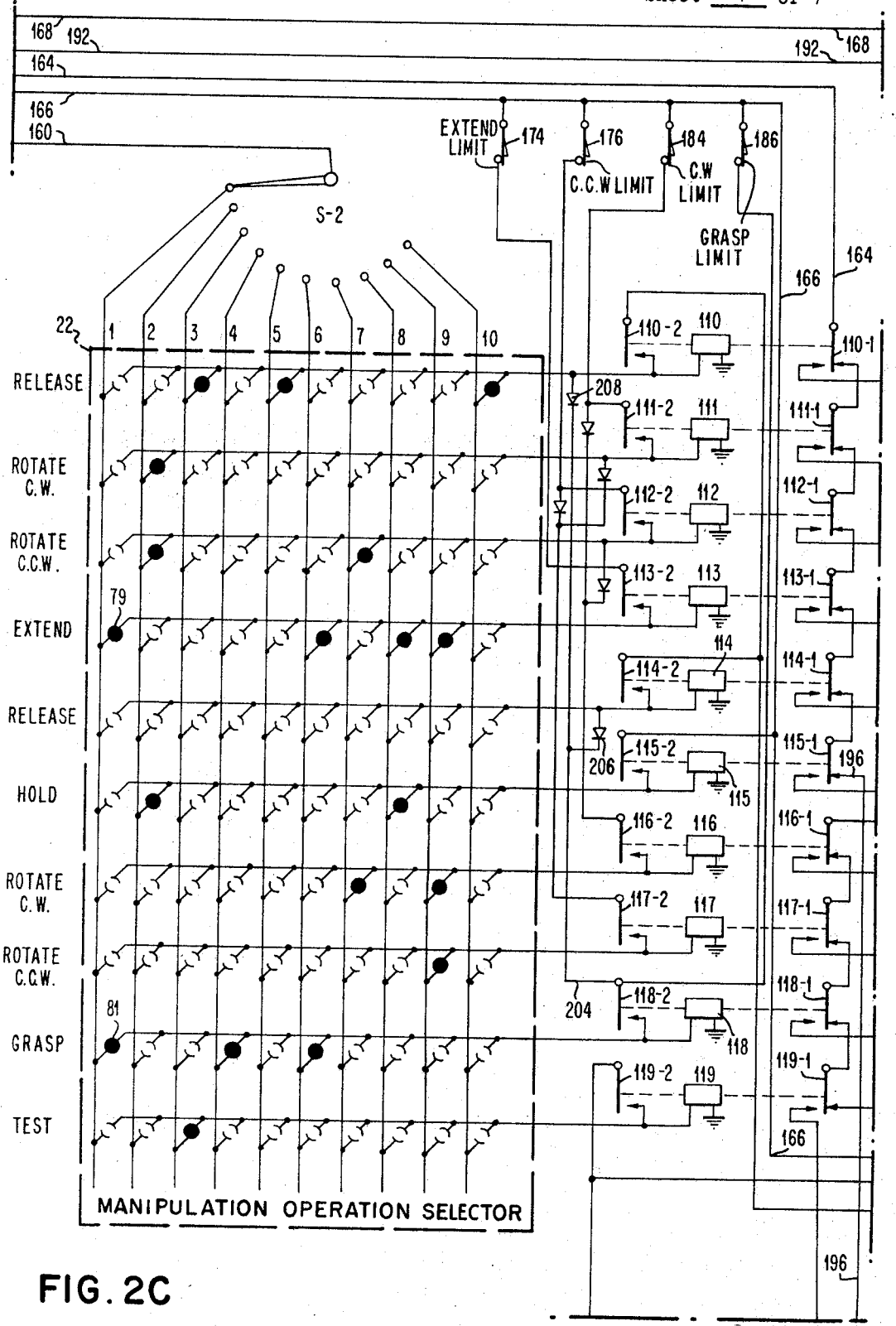
Figure 2E:
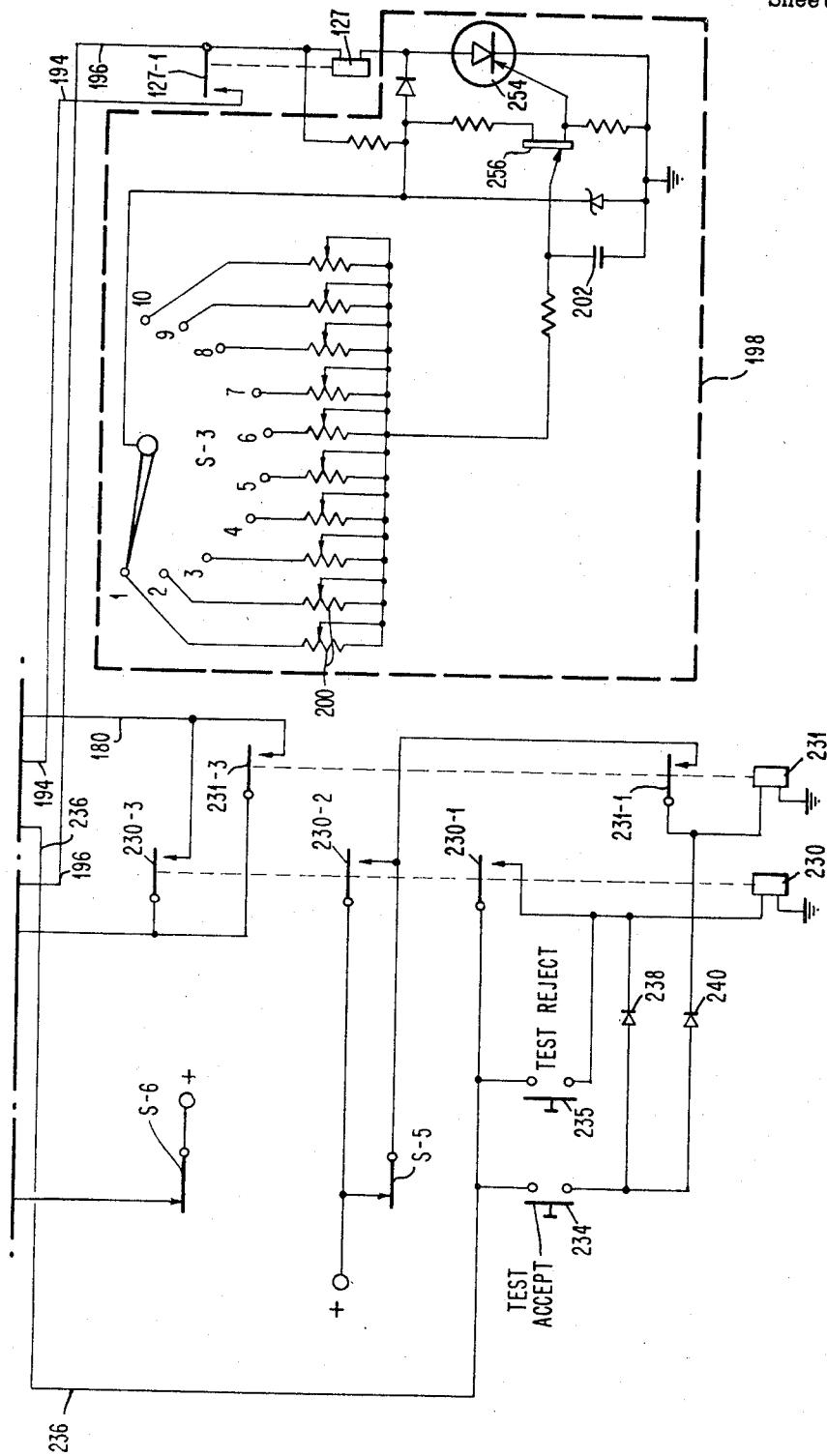

This invention relates to automatic manipulator and positioning systems which are very versatile and which can be quickly changed to operate in different modes to accomplish different purposes.

This is the age of automation. Tremendous recent strides have been made in providing automatic machinery for serving many different purposes and for accomplishing many menial tasks. Generally, such machinery has been very specialized, being designed for one particular specialized purpose. Such purposes may include, for instance, certain specialized steps in the production of an automobile engine, certain steps in the assembly or processing of other automobile parts, conveying parts to selected stations on an assembly line, and so forth. Because of the high degree of specialization, the design and production of automation machinery is generally exceedingly expensive. Accordingly, the large scale use of automation is usually restricted to industrial operations involving tremendous volume and a high rate of repetition of exactly the same operations on a continuous basis. Otherwise, the high cost of the specialized automation machinery cannot be justified. Because of this, the degree of automation achievable in small industrial plants, or larger plants having a large diversity of products where the production runs are not continuous in any one item, and where the degree of repetition is not so great, generally cannot justify an investment in specialized automation equipment.

Various attempts have been made to satisfy this need, and to provide a generalized "automaton" or "robot" which is capable of being quickly programmed to perform various different sequences of functions so as to be adaptable to different situations for short run production use. However, such prior attempts at solution of this problem have generally failed because the machines proposed for this purpose have been very, very costly. Thus, the high cost problem, which prevents small producers, or short run producers, from automating with very specialized equipment, is exactly the factor which prevents them from automating with generalized or versatile machines of prior design. Some of these prior automaton machines have been extremely versatile, but their versatility has been obtained at great cost. For instance, many of these machines require the full use of a general purpose stored program computer for control of the machine. Furthermore, such prior machines, by the nature of their versatility and complexity, are completely beyond the understanding of normal factory setup men, and therefore the machines require the services of a highly skilled and educated technical person for proper setup, operation, and maintenance.

It is one object of the present invention to provide a generalized automaton which can be readily changed to provide many different combinations of positions and manipulations to thereby adapt it for many different automation purposes and cycles, and which is particularly characterized by low cost.

Another object of the present invention is to provide automaton apparatus which is extremely simple to set up and operate so that any normally skilled factory setup man can quickly master the procedure of setting up the machine for a particular operation, and for changing it to any other operation which is desired.

Another object of the invention is to provide an automaton which can be very easily and quickly modified for use for very different types of operations, as well as for different sequences of operations.

Another object of the invention is to provide an automaton which is capable of performing various manipulations at a number of different translational positions or stations, and in which the stations are easily and quickly adjustable in position without the complication of specifying the change of station position in terms of a digital position code, or the like.

Another object of the invention is to provide an automaton having various different stations, and in which the manipulator can be variously programmed to travel to the different stations in any desired order, including any desired number of returns of position to the same station.

Another object of the invention is to provide an automaton equipment which is very easily arranged to be interconnected cooperatively with other related equipment and to operate in conjunction therewith.

Another object of the invention is to provide an improved automaton equipment which provides a simple and unique solution to the problem of synchronizing the various translational and manipulation movements, and which provides particularly desirable timing features, while at the same time avoiding wasted or unnecessary operating time.

Prior automation machinery has most frequently been directed to operations which are either very difficult or impossible to accomplish by hand labor. While the present invention can often be employed, at least in part, for satisfying such needs, it is also capable of serving many manipulative purposes for which skilled employees have been considered to be necessary in the past.

Accordingly, it is another object of the present invention to provide an automaton which is capable of performing manipulation operations which are so complicated as to normally require the services of skilled employees.

Many other objects and advantages will be apparent from the following description and the accompanying drawings.

In carrying out the invention in one preferred embodiment thereof, there may be provided an automatic manipulation and positioning system including a supporting track and a manipulator carriage translationally movable to a plurality of stations upon the track. A control system is provided for operating the system in a series of steps, and including means for selecting one of the stations for each of said steps, and means for selecting a separate combination of manipulation operations for each of said steps. The control system is operable at each step to move the manipulator carriage to the station selected for that step. A station detector is provided at each station and operable in response to the positioning of the manipulator carriage at that station. The control system is operable in response to the operation of the station detector switch of the selected station to stop the manipulator carriage and to operate the manipulator through the selected sequence of manipulation operations.

In the accompanying drawings:

FIG. 1 is a schematic representation of an automaton system in accordance with the present invention.

FIG. 2 (including the combination of FIGS. 2A through 2E) is a schematic circuit diagram of the system of FIG. 1.

FIG. 3 illustrates the mechanical details of a typical manipulator assembly which may be employed in a system in accordance with the present invention.

And FIG. 4 illustrates the mechanical details of an alternative form of manipulator assembly including a pneumatic "grasp" feature.

Referring more particularly to FIG. 1, there is shown a manipulator assembly generally indicated at 10 which is capable of various manipulation movements, and which is suspended from a support 12 forming a track along which the manipulator assembly may be moved to various stations A, B, C, D . . . K. The entire manipulator assembly 10 may be sometimes referred to hereinafter as simply "manipulator." The motive power for the movement of the manipulator assembly 10 may be provided by a motor indicated at 14 connected to the manipulator assembly 10 by a drive chain 16 which passes over an idler pulley 15. The manipulation functions of the manipulator assembly 10, and the translational movement of the assembly under the driving forces from drive motor 14 are controlled by means of a control system 17 including a manual control unit 18, a station selector 20, and a manipulation operation selector 22. The motor 14 is connected to the controls by means of motor power connections 24. The manipulation operations of the manipulator assembly 10 are controlled through connections contained within a cable 26 to the controls 17.

The arrival of the carriage assembly 10 at each of the station A–K is signaled to the control system 17 by the closure of the respective switches 28–46. These switches may be magnetic reed switches. Actuation may be by one or more magnets carried by an arm 47 of the manipulator assembly 10. The position signals are carried from switches 28–46 through a cable 48 to the controls. While not shown in FIG. 1, additional stations and station switches may be provided for. It is contemplated to provide for 10 such stations in the embodiment illustrated in FIG. 1 and FIG. 2, the stations being alphabetically lettered A–K (omitting I). Limit switches shown at 50 and 52 are also provided with connections through cable 48 to tell the control system whenever the manipulator assembly reaches either of its limits of travel.

The manipulator assembly 10 preferably includes a grasping device 54 having a grasp operating motor indicated at 56. These components are supported upon an arm 58 which is arranged for translational movement to an extended position, or to a retracted position by means of a motor indicated at 60. These components are mounted and supported upon a frame 62. The frame 62 is rotatably mounted and supported upon an intermediate body member 64. The frame 62 includes a gear 66 affixed thereto. The intermediate body member 64 includes a rotation action motor having a motor shaft with a pinion gear, indicated at 68, meshing with the gear 66 to impart a rotational motion to the frame 62 and the grasping device 54 whenever such rotation is called for. The intermediate body member 64 is rigidly clamped at 70 to a supporting carriage 72 which includes wheels or rollers 74 engaging with the track 12.

The different manipulation operations which can be selected to be performed by the manipulation assembly 10 at each station are indicated by the lettering appearing on the manipulation operation selector 22. Starting at the bottom of the manipulation operation selector 22, and then continuing at the top, these operations include "grasp, test, release, rotate clockwise, rotate counterclockwise, extend, release, hold, rotate clockwise, and rotate counterclockwise." In addition, an automatic retract operation occurs (if the extend operation has been performed), as will be described more fully below. These operations can be selected to be performed along, or in combination with any or all of the others.

The control system includes manual controls indicated generally at 76. The manual controls provide for complete manual operation of the manipulator assembly for movement to and from various stations, and to positions between stations, and through all of the possible manipulation operations. By this means, the desired positions for each of the stations, and the desired manipulation operations at each of the stations may be determined and worked out in detail in order to set up the apparatus to perform a series of process steps. The positions of the various station switches 28–46 are completely and infinitely adjustable to thereby adjust the station positions to provide for maximum flexibility of the system.

For automatic operation of the system, the controls are set up to operate in ten steps. For each control step, a station position for the manipulator assembly 10 can be selected by means of the station selector 20. Furthermore, for each of the ten steps, a series of manipulation operations can be selected by means of the manipulation selector 22. In each of the selectors 20 and 22, the control steps are indicated by numbered vertical columns, and the stations, or the manipulations, are arranged in a horizontal array.

The station selector 20 includes a multiple contact switch control slider for each control step. The switch slider for each step may be vertically moved to a detent position opposite the letter corresponding to the station to which the manipulator assembly is to move for that particular step. Thus, as shown in FIG. 1, the slider 78 for step 1 is set at station C, providing for travel of the manipulator assembly 10 to station C at step 1. Similarly, the switch for step 2 is set at station B, the switch for step 3 at station E, and so forth, as shown in the drawing. As indicated at step 5, it is possible to set the station selector switch for a later step to the same station as has been set for an earlier step. Thus, the step 5 station switch is set for station 4, the same as the switch for step 4. Step 10 also repeats station K from step 6. The station selector includes a "skip" position at the bottom which is used if a particular control step is not to be employed. The use of this control feature will be explained more fully below.

The manipulation operations are selected in selector 22 for each control step by inserting connector pins in the vertical row corresponding to that particular step, and at each horizontal row corresponding to an operation desired. For example, the operations selected to be performed at step 1 may be simply "extend" and "grasp." These operations are indicated for step 1 in FIG. 1 at 79 and 81. As indicated for steps 4, 5 and 10, it is contemplated that only one operation may be required at a particular step. The manipulator automatically retracts at the end of each step, (if "extend" has been called for) without a selection of that particular operation. The various selected manipulation operations are performed in simple sequence. Those manipulation operations which are not selected are immediately passed by. The complete sequence of operations performed by the system for the first step, with the manipulations selected as shown in FIG. 1, is as follows: the manipulator assembly 10 travels to station C, its arrival being signaled at station C by the closure of contacts 32. The manipulator then extends, by the operation of motor 60. As soon as "extend" is completed, the "grasp" manipulation is performed by the operation of motor 56. As soon as "grasp" is completed, the automatic retract manipulation is performed by the reverse operation of the motor 60.

The apparatus then proceeds to step 2, commencing with movement of the manipulator assembly 10 to station B, and then performance in sequence of the selected manipulation operations for step 2. As indicated in the drawing, these may consist of "rotate clockwise," "rotate counterclockwise," and then "hold." The "hold" operation is one which simply delays all further sequential operations of the system until a signal is received from a source outside of the system. This signal is simply in terms of the closure of a switch, such as a remote limit switch, which indicates the completion of an operation by a machine or apparatus which is operated in association with the apparatus of the present invention, and which is not shown in FIG. 1. For instance, a conveyor might be operated during the "hold" interval until it reaches a prescribed point and actuates a limit switch at that point. Thus, the "hold" operation is completed, and the apparatus proceeds with the next operation.

Whenever a "hold" operation is not called for, an adjustable delay interval is available at the "hold" portion of the cycle of operation at each step. The delay interval for each step is adjustable by means of variable resistors indicated generally at 80 in panel 18. The delay at each step can be set for any period from zero up to the maximum delay design time. The system may be designed to provide any maximum delay desired. In a particular practical embodiment, this maximum delay time is approximately thirty seconds.

The manipulation provided for at each step must always proceed in the exact order indicated in the manipulation operation selector 22 as shown in the drawing. That is, if "grasp" is to be performed in a particular step, this particular manipulation operation must be performed as the last, or next to last, selected manipulation operation of that step. Furthermore, if the "extend" operation is selected, it must be performed before the "grasp" operation. However, the most common operating sequences require that the manipulator should be extended before it is caused to grasp an object. Furthermore, despite the fixed order of manipulation operations which is built into the selector 22, it is possible to select many variations in the order of the manipulation operations by simply providing for the selection of the same station on the next succeeding step, and selecting the desired succeeding manipulation operations in the next succeeding step. For instance, as the settings of the controls are shown in FIG. 1, the manipulator assembly is as station H on step 4, and performs the operation of "grasp." The same station H is selected also for step 5, and the manipulation "release" is next performed in that step at the same station H. It should be emphasized, of course, that the requirement for the operation of "grasp," followed by "release" at the same station is an unusual one.

Tremendous versatility of manipulation operations is normally available within a single step by providing the possibility of repeated selection of a particular manipulation within a single step. Thus, while "rotate clockwise" comes before "rotate counterclockwise" in the upper portion of the manipulation operation selector, and these rotation operations are performed in this order in step 2, the reverse order of rotation also can be accomplished in a single step, as illustrated in step 7. This is done by selecting "rotate counterclockwise" in the upper portion of the selector panel, and later selecting "rotate clockwise" in the lower portion of the manipulation operation selector panel. Similarly, two "release" selections are provided for so that "release" can be performed either before or after selected rotation operations or the "extend" operation.

The mode of operation of the manipulator in sequence through each of the selected operations is accomplished by means of limit switches employed for the detection of the completion of each manipulation step. That is, each movement proceeds to its intended limit of travel, at which time it actuates a limit switch, signaling the system that the operation is complete and that it is time to proceed to the next operation. These limit switches are easily adjustable so that the amount of travel involved in each motion may be tailored to the requirements of the particular job to be accomplished. These limit switches are not illustrated in FIG. 1, but are shown in the schematic wiring diagram of FIG. 2.

The last manipulation operation selector function shown at the bottom of the selector is "test." This particular operation is not truly a manipulation, but is somewhat analogous to the "hold" function. However, the precise function of the test operation is to check for the presence of either one of two possible conditions and to continue the sequence of steps in different ways depending upon which condition is detected. The conditions may be, for instance, the result of an electrical test of an electrical component which is being processed by the apparatus. Another possible test is a dimensional measurement, the measurement indicating either the acceptability or the non-acceptability of the part being checked.

No matter what the test is intended to determine; from a system standpoint, the test operation simply requires that the whole system wait until the test results are in, causing either a first or second switch to be closed (which may be referred to for convenience respectively as "accept" and "reject"). If the test indicates "reject," then the next step is skipped. For instance, if the test is performed at step 3, and if the test result is "reject," then step 4 is skipped, and the entire operation is continued with step 5. However, if the test result is "accept" at step 3, then step 4 is not skipped, but step 5 is skipped. Then, in either case, the operation continues with step 6. This selective skipping of subsequent steps permits the selection of stations and the manipulation operations to, for instance, discard rejected parts rather than continuing the assembly of those parts, or for selective delivery of accepted and rejected parts to different bins or different assembly operations for what may be termed selective assembly.

The terms "accept" and "reject" are merely used for illustrative convenience in the above explanation. It will be understood that the test need not necessarily imply that anything must be rejected. The test may be simply for a dimension as a basis for selective assembly of parts which are not rejected. Furthermore, it is obvious that many different tests may be arranged for to provide the test signals. For instance, a photoelectric scanner may be employed to distinguish between objects or light or dark color, or a radiation detector may be employed to distinguish between radioactive and non-radioactive objects. Thus, there is an infinite variety of distinctive features which may be tested for and used to control the system in this particular "test" operation.

FIG. 2 illustrates the manner in which FIGS. 2A through 2E are intended to be combined to form a single composite drawing. The resultant combined schematic wiring diagram will be referred to below collectively as simply FIG. 2.

Throughout FIG. 2, terminals such as terminal 82 at the left of FIG. 2A are shown with a plus sign to indicate connection to a conventional source of DC power. The DC power source is not shown in detail. This power source is connected between the plus terminals and the common ground connection indicated at various positions in the schematic diagram by a conventional ground symbol.

*Manual operation*

As previously mentioned, one of the important features of the present invention is the capability of the system for operation in a manual mode for set up purposes. A double-throw switch 84 is provided to set the entire system for either manual operation, by movement of the switch to the lower terminal 86, or for automatic operation, by movement of the switch to the upper terminal 88. When at the upper terminal 88, the switch 84 applies power from power terminal 82 to a terminal 90 marked "A." This applies power to a number of power terminals throughout the system which must receive power whenever automatic operation is called for, and which must not receive power when manual operation is called for. These power terminals are each identified in the diagram by the letter "A." Similarly, when switch 84 is in the lower position, it applies power to a terminal 92 which is marked "M." From this terminal, power is applied to a number of power terminals throughout the system which must receive power for manual operation, and which should not receive power during automatic operation. Each such terminal is also marked "M." It will be understood that a relay or contactor, or a pair of relays or contactors may be substituted for the switch 84 to select either automatic or manual operation for the system.

One of the most important manual operating functions is control of the movement of the entire manipulator assembly 10 along the track 12 by means of the motor 14. For this purpose, a manual forward switch 94 is connected to receive power from the "automatic-manual" switch terminal 86. An associated reverse switch 96 is also provided. These switches are respectively connected to control the application of power to the windings of forward and reverse relays 103 and 104. Forward and reverse relays 103 and 104 respectively include power contacts 103–1 and 104–1 which apply power to the positioning motor 14 respectively for forward or reverse movement of the manipulator assembly 10. The other circuits associated with relays 103 and 104 are related to the automatic mode of operation, and will be discussed more fully in connection with that mode below.

Other manual controls provided for in the system include a grasp switch 130 and a release switch 132. Switch 130 is connected to energize the winding of a grasp relay 121 which thereby energizes the grasp motor 56 through a grasp relay contact 121–1. Once the grasp relay 121 picks up, it latches itself in through its own contact 121–2. This hold-in power is obtained through a normally closed contact 122–2 of a release relay 122. The manual release switch 132 is connected to energize the release relay 122, thus opening the holding circuit provided by its contact 122–2. This causes the grasp relay 121 to be released, and the grasp motor 56 to be de-energized. In the present embodiment, the grasping mechanism is spring biased to the released position so that release occurs as soon as the grasping motor 56 is de-energized. The grasping motor 56 may actually be a translational motor or solenoid rather than a conventional rotary motor.

An "extend" pushbutton switch 134 is connected for energization from the "manual" operation bus to provide power to an extend relay 123. Relay 123 has a normally open contact 123–1 connected and arranged to energize the extend motor 60 in the extend direction. A retract pushbutton switch 136 is also provided and connected to energize a relay 124. Relay 124 has a normally open contact 124–1 which is connected to operate the extend motor 60 in the reverse, or "retract" direction.

In similar fashion, pushbutton switches 138 and 140 are respectively provided for the control of clockwise rotation and counterclockwise rotation. This is accomplished by respective connections to relays 125 and 126 which include normally open contacts 125–1 and 126–1 controlling the rotational motor 65.

As previously described above, a complete sequence of movements of the manipulator assembly to various stations, and manipulations at the various stations may be worked out very simply by operation of the system in the manual mode by appropriate operations of the switches just described above. The appropriate sequence of stations to which the manipulator assembly is to move is then set up on the station selector, and the various required manipulations at each station to be performed in each step are set up by placing the connector pins appropriately in the manipulation opeartion selector 22. The system is then presumably ready for automatic operation. Accordingly, the switch lever 84 is shifted to the automatic contact 88.

*Automatic operation—Station selection*

The stepping of the automatic portion of the controls through the various control steps may be accomplished by a chain of relays, or by other switching means. A preferred arrangement is to use a single stepping relay which is similar to those commonly used in automatic telephone exchanges for many years. In the present system, the stepping relay carries the identification letter "S." In the present schematic diagram, the various stepping contacts for relay "S," and the various self-interrupter contacts are generally physically positioned away from the winding of stepping relay "S." This is done merely for reasons of clarity in the presentation. In the case of every other relay, the contacts and the windings are generally illustrated in conventional alignment with one another. The various contacts of the relay "S" are identified by the letter S followed by a hyphen and a number. The stepper relay contacts associated with the station selector 20 are identified as "S–1." As previously explained in connection with FIG. 1, the stations to which the manipulator assembly is to travel at each step are selected by positioning the switches such as switch 78 to correspond to the lettered station desired in that particular step. The station control circuits include the station selector 20, the stepping switch contact "S–1," and latching relays which are identified by the letters A–K (omitting I) to correspond to the stations which they represent. For each of these latching relays, the letter designation for the relay appears at the latching winding. Each of these latching relays includes an unlatching winding shown in alignment beneath the corresponding latching winding. Each of the unlatching windings carries the designation letter corresponding to the station it represents, plus the letter "U." Thus, the unlatching winding for relay A is designated "AU," that for station B is "BU" and so forth.

Assume that the center contact of the stepper switch S–1 is provided with power and that it is in the first step position. Also assume that station C has been selected as the station for step 1, by the appropriate setting of the switch slider contact 78. This applies power from the stepper switch first contact of S–1, through contact 78, and thus through a connection 142 to the winding of latching relay C. Relay C is thus caused to pickup and latch, closing its associated contacts C–1, 2, and 3. As is apparent from the drawing, each of the other latching relays is provided with contacts corresponding to C–1, 2, and 3, except that contacts E–2 and F–2 are not used, and therefore are not shown. The closure of relay contact C–1 completes a circuit from connection 142 through the normally closed contact side of contact B–2, and through the normally closed side of relay contact A–2 to a carriage reverse control connection 144. This provides current through a blocking diode 146 and through the normally closed side of relay contacts 103–2 to energize the winding of reverse relay 104. When relay 104 picks up, as previously described, it energizes the carriage motor 14 for reverse rotation through contacts 104–1. The movement of the manipulator assembly with respect to the stations is assumed to be forward when it is to the right in the diagram, and reverse when it is to the left. In the operation presently being described, it is assumed that we do not know the present position of the carriage of the manipulator assembly. However, it is presumably at one of the stations other than station C, which is the selected station. Since there are only two stations to the left of Station C, and seven stations to the right of Station C, the probability is highest that the manipulator assembly is somewhere to the right of Station C so that the reverse operation of the positioning motor 14 will more often than not be the correct direction for the most rapid possible achievement of the selected position at Station C. As soon as the manipulator assembly reaches Station C, the station switch 32 closes, completing a circuit through normally open relay contact C–3 to a connection 147 to the winding of a relay 105. Relay 105 thus picks up and latches in through its own latching contact 105–1, and a circuit including connection 152 and a normally closed S–4 contact to the A (or automatic) bus. Relay 105 may be termed a stop relay for it stops any movement of the manipulator assembly beyond the selected Station C. This is accomplished by a normally closed contact 105–4 in the common ground circuit of the motor 14 which de-energizes the motor as soon as relay 105 picks up. In order to provide the most rapid starting and stopping of the movement of the manipulator assembly, an electromagnetic clutch and brake arrangement is preferably provided in the mechanical drive train between the motor 14 and the manipulator assembly carriage. These devices, when used, are controlled by the forward and reverse relays 103 and 104, and the stop relay 105. However, the electromagnetic clutch and brake are omitted from the drawings in the present disclosure in the interest of simplicity and clarity.

If the manipulator assembly happened to be at station C at the very outset of operation, then the station detector switch 32 would be closed at the outset and the relay 105 would pickup essenially concurrently with the reverse relay 104 so that the drive motor 14 would not have a chance to move the carriage away from station C.

If the manipulator assembly happens to be at either of the stations A or B when the selected station on the first step is station C, and assuming there had been no previous automatic operation of the system, then the reverse movement of the manipulator assembly (to the left in the diagram) would cause the assembly to proceed to the left limit, and to close the left limit switch 50. This energizes the forward relay 103, closing the forward circuit of the motor 14 through contacts 103–1, and opening the normally closed side of contacts 103–2 to thereby drop out the reverse relay 104. As soon as relay 104 drops out, a holding circuit for forward relay 103 is provided through diode 146, the normally open side of relay contacts 103–2, and the normally closed side of relay contacts 104–2. Thus, once the left limit switch 50 has been closed, the relays 103 and 104 reverse, so that forward relay 103 is energized rather than reverse relay 104 even though the power is being supplied from connection 144 through diode 146 which had initially called for reverse actuation by reverse relay 104. The manipulator assembly and its carriage then travel in the forward direction until station C is reached and the station detector contacts 32 close to stop the motor 14, as previously explained. The equipment is designed in such a way that each of the station detector switches closes every time the manipulator assembly and carriage pass. However, only the station detector switch, such as 32, at the selected station is effective to pick up the stop relay 105. This is true because of the presence of the normally open contacts A–3 through K–3. In the present instance, only the C–3 contact is closed to complete the pick up circuit of stop relay 105.

After all of the manipulations have ben performed which are called for on step 1, the stepping switch advances to step 2. Assume that the station selected for step 2 is station B, as indicated in both FIGS. 1 and 2. Power is then supplied from the step 2 contact of contacts S–1 to the pickup winding of relay B, thus causing relay B to latch up. Relay C continues to be latched up even though it is no longer energized. Thus, relay C "remembers" the station which was last selected, and thus serves to record the present position of the manipulator assembly. At this point, the station indicator contacts 32 remain closed, but the stop relay 105 is not energized because there is no power at the input 78 to the station C relay circuits. The power input through the second contact of stepper switch contacts S–1 is supplied not only to the winding of relay B, but also through normally open contact B–1, through the normally closed side of contacts A–2, and thus to the reverse line 144 to energize the reverse relay 104 and to operate the positioning motor 14 in reverse. This is the correct direction to go from station C to station B. After the manipulator assembly proceeds and arrives at station B, and while input power is still being applied to the latching winding of relay B, all of the unlatch windings AU through KU are energized. The latching relays are constructed in such a way that if both latching and unlatching windings are energized simultaneously, the relay remains latched or picked up. Thus, the energization of unlatch winding BU does not cause relay B to drop out. However, the relay C does become unlatched since its pick up winding C is no longer energized. Again, after all of the manipulation operations called for in step 2 have been performed, then the stepping switch S steps over to step 3, and power is applied through the third contact of S–1 to pick up station relay E. Only relay E, and staton relay B, are now picked up, relay B indicating the present position, and relay E representing the next position. A direction control circuit is now completed from the relay E input, through normally open contact E–1, through normally closed contacts D–2, and C–2, through the normally open side of contacts B–2, and thus to a forward circuit 148. This applies power through the blocking diode 150, through the normally closed side of contacts 104–2, and thus to energize the winding of forward relay 103. Thus, the motor 14 is energized for movement of the manipulator assembly in the forward direction (to the right) which is obviously the correct direction to move the assembly from station B to station E. In the next step, station H is called for. At that time, the direction control circuits include contacts H–1, and normally closed contacts J–2 and K–2 to again call for forward movement, which is the appropriate direction for movement from station E to station H.

From the above explanations of specific direction control operations of the circuits associated with the station relays A–K, it is quite apparent that the circuits for stations A–E automatically cause a checking to determine whether the previously selected station (the present station position) is to the left of the presently selected station. If not, the forward circuit is energized to move the manipulator assembly forward (to the right). Furthermore, the circuits F–K are symmetrical to the circuits for A–E. Thus, the circuits associated with relays F–K check to see whether the station last selected (the present posiion) is to the right of the present selected station. If so, they energize the reverse relay circuit to move the manipulator assembly to the left. If not, the forward control circuit causes forward relay 103 to be picked up to move the manipulaor assembly to the right. Thus, these circuits always check for a positive identification of past position in the smaller group of stations which are beyond the presently selected station in a direction away from the center of the entire group of stations. This arrangement has the advantage that a minimum number of contacts are involved in each of these direction determination operations. Furthermore, on start-up, in the absence of information about the present position of the manipulator assembly, as described above in connection with the first selection of station B, there is a considerable advantage in this circuitry. This is because the circuit assumes that the manipulator assembly must be located at one of the stations in the larger group located towards and beyond the center of the entire group of stations. Thus, when station B was selected, it was assumed that the manipulator assembly must be at one of the stations C–K (or at some point on the track near these stations), rather than at the station A. Even if this assumption was wrong, the manipulator assembly only had a short distance to travel in the reverse direction until it hit the left limit and turned in the forward direction to come back to stations A and B. This is much better than more efficient than having the manipulator assembly erroneously travel from, say, station D all the way through the stations to the right until it hits the right limit switch 52 and travels all the way past station D and C until it reaches B.

Because of the characteristic of the latching relays A–K that they remain latched without energization of the latching coil until the unlatch winding is energized, the last selected relay will always "remember" the station which was last selected. This memory of the last station selected will continue through power failures and through shutdowns of the machine so that the most efficient operation of the manipulator assembly positioning system is always provided for in the automatic mode of operation, even after a shutdown or power failure.

While only ten stations have been illustrated in FIGS. 1 and 2, any desired number of stations either greater or lesser than ten may be employed as needed or desired. For a greater number of stations, the chain of relays A–K is simply expanded, and for a lesser number, it is contracted.

A modification of the direction determination contact connections of the relays A–K which is not illustrated in the drawings is to drop the symmetry about the center of the circuit and to, say, expand the circuits illustrated for positions A–E to encompass all of the positions A–K. Thus, the wiring for positions E–H would be changed to be substantially identical to the wiring shown for positions B, C, and D, and the wiring for relay J would be essentially the same as the wiring shown for relay E. The circuits would always then check to see if the last selected position was to the left of the presently selected position in order to determine the direction of movement of the manipulator assembly. However, the presently illustrated symmetrical arrangement of the wiring for the contacts of these relays is preferred because it provides for a lower maximum number of series connected relay contacts in any particular circuit. Furthermore, it has the virtue of making the best possible direction decision even if there is no latched up position relay to indicate the position which was last selected.

The direction control circuits associated with the latching relays A–K are believed to be somewhat unusual because so few relay contacts and circuits are required to impart all of the information that is required to be known about the presently selected and last selected stations in order to determine the proper direction for carriage and manipulator assembly movement. It might normally be assumed that each relay would have to carry nine contacts to provide information to each of the other nine relays that it represents the station last selected. On the contrary, however, only a single transfer contact is required for this purpose on each relay.

*Automatic cycle controls*

As previously mentioned above, as soon as the selected station has been reached by the manipulator assembly and its carriage, the closure of the associated station detector switch, such as switch 32 for station C, causes the energization and pick up of stop relay 105. Relay 105 then holds in through its own holding contact 105–1. This stops the positioning motor 14 through the operation of normally closed contact 105–4. The complete path of the power to the center contact of stepper switch S–1 may be traced backwards as follows: through the normally closed contact of relay contacts 119–3, normally closed side of contacts 120–2, and normally closed contact S–4 of the stepper relay S to the A (automatic) power bus.

A very brief functional description of the stepping controls is as follows: The stop relay 105 is actuated as soon as the selected station has been reached, as just described. The closure of this relay applies power to the manipulation operation selector through the stepper relay contacts S–2, setting up the manipulations which are called for by operation of manipulation relays 110–119 corresponding to the selected manipulations. Operation of the stop relay 105 also energizes a time delay circuit which causes a relay 120 to pick up. Relay 120 is referred to as a "start action" relay. In response to the operation of relay 120, a signal is provided which causes all of the various manipulations desired in this particular step to be performed. At the end of the cycle of manipulations for the selected step, the manipulator is retracted to provide for the closure of a retract limit switch 156 causing a relay 129 to pick up to indicate that retraction is complete. Relay 129 provides an advance signal to the stepping relay S to thereby commence the next-step and the cycle of operations called for in the next step. The operation of the stepper switch causes stop relay 105 to drop out, and thus causing the start action relay 120 to drop out to thereby set up the controls for the next step including the operation of the positioning motor 14 and the operation of the manipulator through the various manipulations called for.

The circuits for accomplishing the control functions briefly outlined in the above paragraph are as follows. The operation of normally open contact 105–2 of relay 105 provides power from the A bus terminal through normally closed contact S₄, through connection 152, through normally open relay contact 105–2, through a connection 158, through normally closed relay contact 120–1, and then through a connection 160 to the center contact of the stepper switch contacts S₂. The closure of relay contact 105–2 also provides power through connection 158 to energize relay 120. However, an electronic delay circuit 162, which is connected in series with the winding of relay 120 delays the pick up of relay 120 for a period sufficient to assure the appropriate operation of the relays 110–119. As soon as relay 120 picks up, the transfer of relay contact 120–2 causes power to be supplied from connection 152 through that contact 120–2 and a connection 164 to a chain of contacts 110–1 through 119–1 controlling the manipulations. Ultimately, this chain of contacts provides the power from connection 164 to operate the relay 129 to thus indicate the completion of the cycle of manipulations for the step. As previously mentioned, relay 129 provides an advance pulse to stepper relay S. This signal is supplied from connection 158 which is extended through connection 166 to normally open contact 129–1 and then through a connection 168 to the winding of a stepper relay S. The operation of the stepper relay S opens normally closed contact S–4, thus removing power from relays 105, 120, and 129, so that the stepping relay S steps forward only a single step. Thus, the stepping control cycle is complete.

As an additional aid in setting up the entire system to perform a particular series of functions, a manual advance switch 170 is provided for energization from the M (manual) bus to provide power to connection 168 to advance the stepping switch S to thereby check out the operation of the system in the automatic control mode at each particular step. To do this, the automatic-manual switch 84 is placed in the manual position, the advance switch 170 is operated to advance the stepper switch to the desired step, and then the automatic-manual switch 84 is shifted to the automatic side to start the automatic mode of operation. Normally, after all of the setting up is completed, and it is desired to have the machine operate completely automatically, the advance switch 170 will be used to return the stepping switch to the first step, which it does automatically when it is given an advance pulse when it is in the tenth step.

In a versatile system such as the one being described, it will not always be required that there be a full ten steps. If the combination of manipulations requires a small number of steps such as only three, then the locations and manipulations called for on steps 1, 2, and 3 can be repeated on steps 4, 5, and 6 and then again on 7, 8, and 9. This leaves step 10 as an unrequired step. In order to save time in getting past step 10 and back to step 1 as rapidly as possible, a "skip" position is provided for on the station selector 20. This is shown at the bottom of the station selector 20 in FIG. 1, and at the right end of the station selector in FIG. 2. Whenever "skip" is selected, the power coming in on the center contact of stepper switch contacts $S_1$ goes immediately through the skip connection 172 to the input 168 of the stepper switch S, causing the stepper switch to immediately advance to the next step. As a matter of convenience, other skip contacts may also be provided in the station selector, if desired.

*Manipulation operations*

As shown in FIG. 2, the internal wiring of the manipulation operation selector 22 consists basically of a grid of conductors including vertical conductors for each step and horizontal conductors for each manipulation operation. The grid includes arrangements for cross connecting the vertical and horizontal conductors at each intersection by the insertion of a connector pin. Preferably, each interconnection pin also includes a blocking diode within it to prevent back connection circuits. However, the diodes may be wired in separately if desired. This diode feature is not illustrated in the drawing of FIG. 2.

For each of the horizontal conductor levels of the manipulation operation selector, there is a manipulation selection relay having its winding connected for energization from that horizontal level. These relays are respectively numbered 110–119. Whenever a particular step is chosen by the rotational operation of stepper switch contact S–2, all of the manipulations which have been previously selected for that step by the insertion of appropriate pins cause the pick up of one of the associated relay 110–119. For instance, in step 1, the manipulations "extend" and "grasp" have been selected. These selections cause the operation on step 1 of relays 113 and 118. These relays pick up and latch in through their own holding contacts 113–2 and 118–2. After they have had time to pick up and hold themselves in, the time delay provided by the time delay circuit 162 expires and relay 120 picks up, thus opening normally closed contact 120–1 and removing power from connection 160 to the center contact of the stepper switch contacts S–2. The holding circuit for relay 113 includes an "extend" limit switch 174 which completes a hold circuit to connection 166 provided with power through normally open contact 105–2. The relay 118 holding circuit similarly includes a connection from 166 through a grasp limit switch 186. At the time that relay 120 operates, power is provided through the normally open side of 120–2, connection 164, and thus through the normally closed contacts 110–1, 111–1, and 112–1 to the lever 113–1. Since relay 113 is picked up, this power is transmitted through the normally open side of 113–1 to connection 172, and thus to the "extend" relay 123. Contacts 123–1 thus operate extend motor 60. When the extend operation is complete, this is signaled by the opening of the extend limit switch 174. This interrupts the holding circuit for relay 113 causing it to drop out. Thus, the input power on relay lever 113–1 is transferred to the normally closed connection and thus through the normally closed contacts of 114–1, 115–1, and the delay contact 127–1. This delay circuit is explained below. At completion of the delay, power continues to 116–1, and 117–1 to the lever 118–1. Since relay 118 is picked up and held in, this power is transmitted through the normally open side of 118–1 and a connection 178 to the grasp relay 121. Relay 121 thus picks up and closes contact 121–1, operating grasp motor 56 in the counterclockwise direction to accomplish this manipulation operation. When the grasp operation is completed, the grasp limit switch 186 is opened, causing an interruption of the holding circuit for relay 118. The power on lever 118–1 then continues down through the normally closed side of 119–1, through conection 180 to the retract limit switch 156, and also through a diode 182 to the retract relay 124. Operation of relay 124 causes energization of the motor 60 through contact 124–1 in the retract direction until the completion of the retract operation signaled by the closure of retract limit switch 156. This operates relay 129, closing contact 129–1, and supplying a stepping signal through connection 168 to the stepping relay S.

The above example illustrates the mode of operation of the manipulation operation selector and the manipulation selection relays 110 through 119 and the associated apparatus. Thus, whenever a particular manipulation operation is not selected, the current from connection 164 proceeds directly through the normally closed contacts of the unselected operation relays from the group 110–1 through 119–1 until it reaches the operated relay. At this juncture, the current transmitted down through this relay contact chain is supplied to one o fthe operation relays such as 121 through 126. Whenever the operation is completed, the operation selection relay generally drops out and the current originating at connection 164 continues down through the relay contact chain to ultimately cause an advance pulse through the operation of relay 129. Thus, there is provided a clockwise limit switch 184 and a grasp limit switch 186 to release the holding circuits for the rotate clockwise operation selection relays 111 and 116, and the grasp relay 118. There is no release limit switch in the preferred embodiment of the invention since "release" is simply a spring biased return which occurs when grasp energization is discontinued. However, a release completion signal is provided through the normally closed side of contact lever 122–1 of release relay 122. The operation of this contact lever opens the holding circuits for release relays 110 and 114.

There is one exception to the above-described typical mode of operation. This involves the "hold" operation selection relay 115. Relay 115 has a holding circuit through its contact 115–2 which is connected directly to the power conductor 166. Thus, once picked up, this relay 115 remains picked up during the entire manipulation cycle of a particular step. The current from the lever 15–1 then passes through the normally open contact and through connection 188 to a normally open relay contact 128–1 of a relay 128. Relay 128 is provided for the purpose of detecting the presence of a remote input signal which picks up the relay 128. This remote input signal is represented in FIG. 2 by means of a pushbutton switch 190. Switch 190 energizes relay 128 through a circuit connection 192 extending back to a normally open contact 120–3 of relay 120. As previously explained above, the remote input may be a manual input signal, or preferably an input signal from another machine which is operated in conjunction with the present apparatus and which indicates the completion of a particular operation which is required with the sequence of manipulations. In any case, when the remote input signal represented by pushbutton switch 190 is achieved, relay 128 picks up and is held in through its own normally open contact 128–2. This closes the circuit of 128–1 to complete a connection back through a conductor 194 to the lever of 116–1 to continue the operation current through a chain of associated relay contacts.

If relay 115 is not operated, then the current from the normally closed side of 115–1 is supplied through a connection 196 to a time delay relay 127. After the relay 127 picks up, as determined by a selected delay time, the closure of its associated contact 127–1 completes the circuit back to connection 194 and the lever of 116–1 to continue the sequence of manipulation operations.

The time delay of relay 127 is determined by an electronic time delay circuit 198 which is very similar to the previously mentioned time delay circuit 162 for relay 120. However, one unusual feature of this electronic time delay circuit is the provision of a plurality of variable resistors 200 arranged for connection in series with the timing capacitor 202 to provide a different time delay determined by the particular resistor setting for each step. The variable resistors 200 are selectively connected in circuit with capacitor 202 for each step by the contact S–3 of the stepping relay S. Thus, as previously discussed, a variable time delay may be obtained at each step. This time delay may vary from zero up to approximately thirty seconds in a particular physical embodiment. Other maximum delay periods may be provided if desired.

One of the most common manipulations called for is a grasp operation near the end of a particular step, and a continuation of the grasp into the next step, with movement of the grasped object with the manipulator assembly to the new station before a release occurs through the operation controlled by either of the relays 110 or 114. Furthermore, it may be practical in the succeeding step to release the object brought to the new station, and perhaps to "extend" and then grasp a new object on that succeeding step. The holdover of the grasp energization is provided by the holding circuit through the normally closed contact 122–2 of the release relay, and the normally open contact 121–2 of the grasp relay.

However, the performance of the grasp operation in the second step is subject to the problem that the holding circuit of the grasp operation selection relay 118 is held open by the opening of the grasp limit switch 186 during the initial interval when the grasp relay 118 is picked up through current supplied through the center contact of step switch contacts S–2. To overcome this problem, alternate hold circuits are provided for grasp selection relay 118 through a connection 204 and diodes 206 and 208 from the release relay holding circuits. Thus, if release and grasp are both called for on the same step, the grasp relay 118 is assured of a holding circuit even though the grasp limit may be open at the outset of that step. A further problem is encountered in this respect as the release relays 110 and 114 drop out at the performance of the release operation. However, the grasp limit switch 186 closes to provide the expected holding circuit for relay 118 as "release" is accomplished, and the release relays 110 or 114 drop out.

The operation in response to the selection of the test manipulation is also somewhat different, and analogous in some respects to the "hold" operation. Very briefly described, when the "test" operation selection relay 119 is picked up, the manipulation operation current path is interrupted at relay lever 119–1 on the normally closed side. The circuit to connection 180 is then not completed until one of the relays 230 or 231 is operated. Thus, the system waits until an external signal is received indicating that one condition or another is satisfied. These conditions are arbitrarily indicated on the diagram as either "test accept" or "test reject," and the signal sources for these conditions are signified respectively by pushbutton switches 234 and 235. If the test result is "accept" both relays 230 and 231 pick up, thus completing the signal path to connection 180 and causing retraction and operation of the retract limit relay 129. This causes stepping relay S to step, dropping out relays 105 and 120 in accordance with the regular operation, and also causing relay 230 to drop out. The entire next cycle of positioning and manipulation operations for the next step is then performed and stepping relay S then steps again. At this point, relay 231 drops out and stepping relay S is caused to step again without performing the positioning and manipulation operations (a skip operation) and relay 119 then drops out. The "test" operation is then complete. Thus, whenever "test" is selected, and the test result is "accept," the second succeeding step in the operation of the system is skipped. However, if the test result is "reject," then the first succeeding step is skipped. In this latter instance, only relay 230 is picked up in response to a "reject" signal, then when the relay S steps, relays 105, 120, and 230 all drop out and a skip signal is immediately supplied to the stepping relay. When the stepping relay performs the skip step operation, relay 119 drops out and the system proceeds with the remaining steps in the usual manner.

A more detailed description of the circuits which perform these operations is as follows. The "accept" and "reject" switches 234 and 235 are provided with power through a conductor 236 from relay contact 120–3. When accept switch 234 is closed, it energizes the winding of relay 230 through diode 238, and relay 230 holds in through its own holding contact 230–1 which connects with supply conductor 236. Accept switch 234 also completes a pick up circuit through a diode 240 to relay 231. Relay 231 holds itself in through holding contact 231–1, and a circuit including normally open contact 230–2 and S–5 connected in parallel to the power source. Operation of relays 230 and 231 closes contacts 230–3 and 231–3, thus completing the circuit to connection 180 to operate the retract circuit and ultimately the retract limit or advance relay 129. As a result, stepping relay S is provided with an advance signal through connection 168. The resultant opening of the interrupter switch S–4 of stepping switch S drops out stop relay 105 and action relay 120. This removes power from the holding circuit for relay 230 including conductor 236 by reason of the opening of normally open contact 120–3. Power is now supplied through the normally closed side of contact 120–2 to a lever of relay 119 which is designated 119–3. Since relay 119 is picked up, this lever is connected to the normally open side, which interrupts the normal circuit to the center contact of stepper switch contacts S–1. The power is connected instead to the lever 231–2 of relay 231. However, since relay 231 is picked up, (as it is for "accept") this lever is connected to its normally open side to provide for transmission of the power through a connection 242 and on to stepper switch contact S–1. Thus, the next step is performed without a skip. At the end of the manipulation cycle of operation, the manipulation current is passed around relay contact 119–1 by the closed relay contacts 231–3. The relay 119 remains energized through its holding circuits during the previous operation of stepping relays S. The holding circuits for relay 119 include an S relay switch S–6, and also, through a connection 244, a switch contact 129–2 of the advance control relay 129. This combination of contacts in the holding circuit of relay 119 maintains relay 119 held in for the normal advance operation involving the operation of relay 129 because relay 129 is always picked up, closing the circuit including 129–2 whenever the S relay contact S–6 are opened. However, when there is a skip operation S–6 contacts open without the closure of the 129–2 contacts.

Furthermore, during the previously described normal advance operation of relay S, relay 231 was continuously held up by the contacts 230–2 despite the momentary opening of contacts S–5. When the next drop out of relay 120 occurs it interrupts the holding circuit for relay 230 at 120–3. Then on the next following operation, the interruption at S–5 causes relay 231 to drop out in the absence of shunt circuit 230–2.

The de-energization of relay 231 causes closure of the normally closed side of contacts 231–2, completing a power circuit through connection 246 to the winding of stepping relay S to provide a skip operation. This causes the holding circuit of relay 119 to be interrupted by contact S–6, since contact 129–2 is not closed at the time of that interruption of contact S–6. The apparatus then continues with the succeeding steps just as it would if the test operation had not been called for.

If the test result is "reject," then switch 235 is closed, picking up and holding in only relay 230. The manipulation current circuit is then completed through contact 230–3 to the retraction relay 124 and the advance relay 129. When the stepping switch S then steps for a new step in the operations, the resultant de-energization of relay 120 causes relay 230 to drop out. Furthermore, since relay 231 had not been picked up, the skip circuit through contact 231–2 and connection 246 is immediately completed, causing a skip operation of stepping relay S and causing test operation selection relay 119 to drop out as previously described. Again, the apparatus then continues as before.

From the above description, it is clear that the "test" mode of operation provides an unusual versatility in the apparatus in that a test may be performed and either the first succeeding step, or the second succeeding step is skipped as determined by the result of the test. It is to be understood that the "accept" and "reject" pushbuttons 234 and 235 are intended to be only schematic representations of what could be much more elaborate and sophisticated electrical testing apparatus. Stated another way, these pushbuttons could represent relays controlled by electrical testing apparatus which performs the test. The different modes of operation in the apparatus controlled by the test results could be termed a "branching" operation in that the machine makes a decision based upon the test results and follows either one branch of procedure or the other depending upon that result. It will be quite apparent that various other branching or testing operations could be performed with relatively minor modifications in the circuits. For instance, one of the test result signals could pick up a relay having a holding circuit connected through an "off-home" contact of the stepping relay S. This is a contact which is commonly provided on stepping relays which remains closed at all times except when the stepping relay is on its first step position. The test relay having its holding circuit through the "off-home" contact could be provided with an output contact circuit giving a continuous skip signal to the stepping relay so that the entire system would return to the first step and "try again" the operation which resulted in an unsuccessful test.

In order to obtain optimum timing in the drop out operation of relays 120 and 129, each of these relays is provided with a parallel connected branch circuit consisting of a capacitor and resistor for establishing a delayed decay of voltage across the relay winding. For relay 120, these components are shown at 250. For relay 129, they are shown at 252.

The time delay circuits 162 for relay 120, and 198 for relay 127, are each of presently known conventional construction. Each includes a silicon controlled rectifier (SCR) 254 triggered by a unijunction transistor 256.

*Mechanical features*

FIG. 3 is an enlarged detail view of the manipulator assembly 10 of FIG. 1, and the apparatus associated therewith. In this assembly, the grasping device 54 may be actuated by an electromagnetic motor 56. Motor 56 may typically be an electromagnetic solenoid, or it may be a screw jack motor. Either of which provide a rotational movement of the grasping device arm 260 about the center pivot 261. The cooperating fixed arm 262 of the grasping mechanism is provided with a slotted opening 264 to accommodate the pivot 261. When the grasp operation is completed by the engagement of the lower tips of both of the arms 260 and 262 with the object to be grasped, the slotted pivot opening 264 permits a lost motion travel of the pivot 261 to the left in the slot 264. A grasp limit switch 186 is provided having a rotatable operating lever arm 268 which engages with the pivot pin 261. The motion of the pin 261 in the slot 264 at the end of the grasp operation is sufficient to rotate the lever 268 enough to actuate the grasp limit switch 186 to indicate that the grasp operation has been performed.

The grasp device 54 is supported upon an arm 58 which is arranged for translational movement to an extended position (as shown), or to a retracted position by means of a motor 60. The motor 60 may be a screw jack motor. The arm 58 is supported at its right end by a bearing structure 270 which is attached, along with motor 60, to a frame member 272. The frame member 272 is attached to and supported upon a frame 62 by means of interlocking rails, including L-shaped rails 274 which are fixed to frame member 272 and have inwardly extending tips, and rails 276 fixed to frame member 62 and having outwardly extending tips which firmly engage with the inwardly extending tips of rails 274. This arrangement of rails for support of the frame member 272 upon the frame 62 is very convenient because assembly and disassembly is easily accomplished by simply sliding frame member 272 horizontally with respect to frame 62, thus sliding the rails 274 off of the rails 276. When assembly is completed, a small screw or bolt (not shown) is sufficient to keep these parts in assembled relationship with the frame member 272 centered beneath the frame 62.

Mounted at the underside of frame member 272, there are two limit switches including retract switch 156 and extend switch 174 which are positioned and arranged for actuation by a small cam button on the upper end of grasping device member 262.

For clarity in the drawing, the grasping device 54 and the extending and retracting mechanism including motor 60 are illustrated as operating in the same plane. However, the preferred arrangement of these parts is with the grasping mechanism 54 rotated 90 degrees with respect to the extend and retract arm 58. This permits the two grasping arms 260 and 262 to be moved in on both sides of an object to be grasped by the "extend" operation of arm 58. However, such an approach can also be made with the arrangement as illustrated in FIG. 3 by rotation of the frame 62 by the rotation motor included within the intermediate body member 64.

As explained previously, the intermediate body member 64 includes a rotation motor which drives a pinion gear 68 meshing with the gear 66 which is integral with the frame 62. By this means, the entire frame 62, and all of the apparatus supported beneath frame 62 can be rotated at will. Limit switches are preferably provided to govern the maximum limit of this rotational movement, but they are not shown in FIG. 3.

At 70, the intermediate body member 64 is provided with integral mounting rails 274A having inwardly extending tips, and the carriage 72 is provided with integral rails 276A having outwardly extending tips. Rails 274A and 276A are arranged to engage and establish a supporting connection between the intermediate body 64 and the carriage 72 in the same manner as explained above for rails 274 and 276. It is an interesting and useful feature of the invention that the entire rotational structure including intermediate body 64, the gears 66 and 68, and the frame member 62 (all of the apparatus vertically arranged between rails 274A and 276) may be omitted from the manipulator assembly, if the rotation function is not required. Thus, the rails 274 of frame member 272 may be mounted directly to carriage rails 276A.

In this preferred embodiment, the station switch such as station switch 32, is a reed switch. This is a small switch which is now commonly available and which includes small reed-like switch contact levers enclosed within an evacuated glass envelope and actuable to a closed position by the presence of a magnetic field which may be provided by mechanically positioning a permanent magnet near the switch. This is the mode of operation employed in the embodiment of FIG. 3. The arm 47 is attached to and movable with the carriage 72. It preferably carries two permanent magnets 278 and 280. The reason for these two magnets is to accommodate for overtravel of the carriage after the stop signal is given by closure of station switch 32. With an electromagnetic clutch and brake arrangement for starting and stopping the positioning motor 14, the carriage and the entire manipulator assembly can be stopped quite rapidly. However, it is virtually impossible to make the carriage stop instantaneously so as to achieve exactly the same position no matter which direction the carriage approaches the station from. Accordingly, the two magnets 278 and 280 are preferably spaced apart laterally by a distance corresponding to essentially twice the usual overtravel of the carriage. Thus, if the carriage is moving to the right as it approaches the station switch 32, the station switch is first actuated by magnet 280, and the carriage stops by the time the arm 47 is essentially centered at the station switch 32. If the approach is by movement to the left, then the first actuation is by the magnet 278, and again the carriage comes to a stop with the arm 47 centered over the switch 32. Thus, a highly reproducible position of the carriage is achieved by the arrangement including the two actuating magnets 278 and 280. Another advantage of the double magnet arrangement is that each magnet provides a safety back up for the other one in case the first magnet to approach the switch does not reliably actuate it.

The reed switch 32 is mounted upon a holder, which in turn is slidably supported upon a rail 282. This slidable mounting for switch 32 is fixed in position by means of a screw threaded fastening 284 which attaches it to a fixed member 286. Member 286 is fixed to the rail 282 by means of set screws. When the set screws are loosened, it may be slidably positioned upon the rail 282. By means of this construction, the desired position of the switch 32 may be established by loosening the set screws in member 286 and sliding the entire assembly including the screw member 284 and the switch 32 and its mounting along the rail to the proper general location. The set screws are then tightened, and any fine adjustment of the position of the switch 32 which is required is accomplished by adjusting the screw threaded member 284 by means of its knurled adjustment wheel. This device has right-hand threads on one side and left-hand threads on the other so that simple rotation causes either a greater or lesser spacing between the member 286 and the switch 32. In this manner, the switch 32 can be adjusted to precisely the proper position.

FIG. 4 illustrates an alternative embodiment of the manipulator assembly including a pneumatic grasp feature and a vertical extend and retract motion. The construction of the upper portion of the manipulator assembly of FIG. 4 is identical to that of FIG. 3. This applies to all of the structure from the top down to and including the frame 62. To provide a better understanding of the structure of these upper portions of the manipulator assembly, they are illustrated in an end view in FIG. 4 rather than repeating the side view of FIG. 3.

Beneath the frame 62, the portion of the manipulator assembly of FIG. 4 which is new includes a vacuum cup grasping device 288 attached to a hollow tubular shaft 290. A spring biased latch is provided to hold the grasping device 288 in the retracted position. It consists of the armature of an "extend" solenoid 292. A retract solenoid 294 is provided to bring the grasping device or "hand" back to the retracted position. The "retract" and "extend" positions are detected by limit switches 156B and 174B actuated by an arm 296 which forms a part of the stem 290. This upper portion of stem 290 includes a fitting for the attachment of a flexible pneumatic hose 298 which is connected through a vacuum switch 186B to a pneumatic control valve 300. Valve 300 is preferably an electromagnetically actuated valve which is spring biased to the inactive position. This valve 300, when actuated, accomplishes control of the grasp function for it establishes a connection from the fitting 302 to the flexible hose 298. Fitting 302 is connected to a vacuum pump (not illustrated), and therefore the establishment of this connection by valve 300 provides an influx of air at the grasping vacuum cup 288. This tends to provide a grasping action at the cup which is particularly effective in grasping objects having flat upper surfaces. When an object has been grasped in this manner, it effectively closes the opening in the air passage through the center of stem 290, thus increasing the vacuum in the system. This increase in vacuum is detected by the vacuum switch 186B which thereby provides a "grasp" signal detecting the fact that the "grasp" operation has been performed. When the grasped article is to be released, the electromagnetic valve 300 is released and returns to the inactive position. This closes the port to the vacuum pump fitting 302 and opens a port which communicates with a vent opening at fitting 304 so that the vacuum passage to grasping cup 288 is vented to the atmosphere, thus relieving the vacuum condition and releasing the grasped object. All of the apparatus just described at the lower portion of the manipulator assembly is mounted upon a frame member 272B, which is attached to the frame 62 by means of attachment rails 274B which are identical to the rails 274 illustrated in FIG. 3. Thus, the vacuum grasping sub-assembly from rails 274B down may be interchangeably connected to the rest of the manipulator assembly instead of the mechanical grasping mechanism illustrated in FIG. 3.

In a typical cycle of operation of the extending and grasping mechanism illustrated in FIG. 4, the grasping device is extended by operating the solenoid 292 to release the stem 290. The grasp solenoid valve 300 is then actuated to apply the vacuum, the article is picked up, and the vacuum switch 186B signals that grasp has been accomplished. The grasping device 288 is then retracted with its load by actuation of retract solenoid 294. Typically, the manipulator assembly may then be moved to another station in the next step of the operation of the apparatus, and the object is released either from the retracted or extended position of the grasping device.

*Additional features*

There are a number of features which have not been illustrated and described above, but which are very useful in a practical physical embodiment of the invention. For instance, it is a particularly useful feature to include a cycle counter which may be actuated, for instance, by the stepping relay S each time it passes step 10. In this way, the total number of cycles is recorded and directly readable in order to keep track of the total output of the apparatus. The counter can also be used to stop the system at the end of a predetermined count.

Another useful feature has been found to be in the employment of a two-speed or variable positioning motor 14 instead of the single-speed motor. The circuits may be set up in such a way that the low-motor speed is always employed with manual operation when it is important to carefully gage the position of the manipulator assembly during "set up," and the high motor speed is always employed in automatic operation when the important factor is to perform all operations as rapidly as possible.

Another very useful feature is to provide various indicator lights to indicate which step the apparatus is in at a particular time, and to indicate various other features of the operation of the system. For instance, it has been found to be useful to illuminate indicator lights under the control of the stepping switch S to cause illumination of the station selector switches as each step is performed so as to show which station has been selected. Such information can be remotely indicated if desired by providing auxiliary contacts on the station selection relays A–K. If desired, indicator lights may be provided and switched by auxiliary contacts on virtually any or all of the relays so that the operation of the system can be easily followed, and any possible malfunction can be easily and quickly detected for ease and speed of servicing, and for added convenience in setting up the system to perform a particular combination of manipulations. Furthermore, auxiliary contacts may be provided on each of the station selection relays, or on the manipulation selection relays, or on any of the other relays in the system in order to provide convenient output signal circuits for the control of apparatus which may be operated in conjunction with the apparatus of the present invention. For instance, if the apparatus of the present invention is used in a machining and assembling manufacturing operation, an auxiliary output may be initiated from a particular station selection relay to start a metal working machine which is to perform an operation at that particular station.

It is obvious that many other additional features may be provided in the systems in accordance with the present invention without departing from the spirit of the invention.

*Modifications*

There are obviously many modifications which may be made in the system as disclosed, without departing from the invention. For instance, the number of stations may be expanded or reduced from the ten stations shown in the drawings. Furthermore, a larger or smaller number of steps may be provided for. Similarly, a greater or lesser number of manipulation operations may be provided for in the manipulation operation selector and the associated relay circuits. Also, the sequence of manipulation operations may be changed in different physical embodiments if this is found to add to the convenience and versatility of the apparatus.

Various forms of motive power may be employed. While the embodiments shown have relied chiefly on electric motors, it is obvious that other motive systems may be employed such as pneumatic or hydraulic systems. For instance, the function of the positioning motor 14 may be performed by a pneumatic or hydraulic positioning motor without any substantial change in the control system. Instead of energizing the electric motor, the motor control relays would simply be connected to actuate electromagnetic pneumatic or hydraulic valves which would in turn control the pneumatic or hydraulic motor.

The control system has been illustrated entirely in terms of the employment of relays as switching devices, with the exception that a few solid state devices are employed in the timing circuits. While relays are the preferred switching devices, it is obvious that many other types of switching devices may be employed in control systems in accordance with the present invention without departing from the spirit of the invention. For instance, solid state switching devices may be substituted for the relays in many portions of the control system, if desired. The relay switching devices are properly described as "two-state" switching devices since they are either in a first state of being energized (armature picked up), or in a second state of being de-energized (armature released). Where switching devices other than relays are substituted, they are likewise operated in a two-state mode. Accordingly, all of such switching devices (relay or non-relay) are generically referred to below as simply "two-state switching devices." Furthermore, where relays are employed, one or more switch levers may be provided on each relay to accomplish several circuit opening and closing functions in response to a single relay actuation. When other switching devices are substituted for the relays, it may be necessary to employ several such devices to accomplish the purpose of a single relay. Such a group of devices which is substituted for a single relay may be encompassed within the generic term "two-state switching device."

One of the most important features of the invention is that the accuracy of positioning of the manipulator and manipulator assembly is not a function of the length of travel. This is due to the fact that the station switches and the limit switches determining the end of particular manipulation operations may be mechanically adjusted to any desired positions, and their operation therefore is not determined by the distance between those adjusted positions. This is in contrast to many prior automaton systems in which the positions are often digitally coded, and the digital code which is provided must necessarily assign a code for every possible position in the path of travel for each motion. This necessarily makes the accuracy of the final position dependent upon the total distance of the travel provided in the system.

The switches or detectors which indicate the achievement of the desired station position and the completion of various manipulation functions may be embodied in many different physical forms. For instance, the station detectors may be carried out with cam switches, magnetic inductors, photoelectric detectors, or capacitor switches, or other types of proximity switches, in addition to the magnetically actuated reed switches shown. Similarly, various different switching devices may be employed to provide the limit switch function for the various manipulation operations. And it is possible to expand the utility of the system, if desired, to provide for operation of the various manipulation functions to various intermediate stations of travel. This can be accomplished by adapting the station selection circuitry associated with the station selector to provide for operation of various manipulations to various different stations.

Furthermore, simple methods may be employed for accommodating for automatically variable travel in certain manipulation operations. Such an automatically variable travel is illustrated for instance in connection with the manipulator embodiment of FIG. 3 is the actuation of the grasp completion limit switch 186 by the lost motion movement of the grasping device pin 261 through the slot 264. This provides for a grasp completion signal whenever an object is tightly grasped, no matter what the size of the object. A similar accommodation for various sizes or clearances may be made in other ways. For instance, an "extend" limit switch may be alternatively provided in the embodiment of FIG. 4 by attaching it to the stem 290 of the grasping device 288 and providing a "feeler" to actuate the extend switch whenever the vacuum cup 288 is extended far enough to be against the flat surface of the object which it is to pick up. A stack of objects such as small flat sheets may be operated upon satisfactorily even though that stack may vary substantially in height. Another modification in the "extend" limit switch in FIG. 4 which permits variable travel is to provide a cam on stem 290 which rides against the limit switch actuator as the vacuum cup descends, and permitting additional travel beyond the point of actuation of the limit switch. Other variable limit signal modes are, for instance, the determination of the limit by an increase in drive motor current. For instance, the rotation manipulation operation may be arranged to perform the assembly of a screw threaded part, and this rotation manipulation may continue for many revolutions and be desired to continue until the screw threaded part is tightly assembled. The detection of the tightly assembled condition may be detected by the increase in current in the rotation drive motor as the load increases when the fastening is tight. In such an application, the rotation motor may be protected by a friction clutch which slips when the part is tight.

As mentioned in connection with the description of FIGS. 3 and 4, with the system of mounting rails as illustrated in those figures, various manipulator components may be added to or removed from the manipulator assembly without the necessity for any changes in the control system. This provides for tremendous ease in replacement of worn manipulators, and in adapting the apparatus to various specialized functions by rapid change from one type of manipulator to another. For instance, simple mechanical and pneumatic grasp mechanisms have been illustrated. However, it is obvious that other apparatus and other principles may be employed for the grasp function. One of the most obvious being a magnetic grasp device which is useful for picking up parts made of magnetic material. Furthermore, while each of the grasping arrangements illustrated or discussed so far involves some continuous expenditure of energy, or energization of the grasp device, it will be obvious that grasp devices can be devised which will continuously hold the part which is grasped, without the continuous energization of the grasp device, until a positive release function is performed by the release apparatus. For instance, the grasping device may constitute a kind of "hook" which grasps by rotating through a hanger bolt on the part to be supported or carried and which remains in that rotated "grasp" position until rotated in the opposite direction by the release circuitry.

Another interesting modification which may be provided in the manipulator assembly is to substitute an additional "extend" and "retract" function unit instead of the rotation function unit which is illustrated at the intermediate position in FIGS. 3 and 4. This modification may be employed without any change in the control system. It is merely necessary for the operator to remember that "rotate clockwise" is changed to "auxiliary extend," and "rotate counterclockwise" is changed to "auxiliary retract."

One of the features of the manipulators in accordance with the present invention is that the manipulator drive members generally do not carry a substantial portion of the load. It has been one of the characteristic features of prior automatons that the manipulators have often been fabricated to simulate a human arm and wrist and hand. This has generally been a cantilevered structure which is often subjected to tremendous bending stresses and serious wear problems in the wrist joints. However, in the present invention, the manipulator parts are generally and more typically in simple tension, being suspended from the track member 12 and being suspended above the work and the parts to be lifted and manipulated.

The interchangeability of manipulators and manipulator components is a very useful feature, as mentioned above, in adapting the apparatus to many different specialized functions without the necessity for any change in the control system. Furthermore, the control system may be employed quite successfully with manipulators of many different sizes. For instance, a tiny precision manipulator may be employed for handling and processing parts of watches, or a very large manipulator may be employed for lifting and conveying and manipulating heavy machine castings such as may be required with large electrical turbine generators. These examples and many physical sizes ranging between them can all be satisfactorily operated with the same versatile control system in accordance with the present invention.

The system of the present invention has been illustrated with the supporting track 12 as a perfectly straight track. However, the track may be bent or curved in any desired manner, and may be extended indefinitely in length, if necessary. In such an arrangement, it is generally desirable to place the positioning motor 14 within the carriage 72 and to make provision for the electrical connections between the carriage, and the rest of the manipulator assembly, and the control system by means of brush contacts and electrical current collector bars arranged continuously along the support member 12.

The automaton in accordance with the present invention may be combined in a system with one or more automatons of the same design. Thus, an industrial installation such as a manufacturing plant or a packaging plant may employ a master automaton and branch automatons which feed articles into or out of the master automaton. Versatile interconnections through the hold circuits, or the test circuits would provide for one automaton to wait for the completion of operations of another when that is necessary. Furthermore, the output terminals of various relays on one automaton may be used to control the operation of other automatons in such a complex arrangement. For instance, where one automaton waits on another, the remote input indicating the end of the "hold" operation may be provided by one of the output circuits of a relay of the automaton which is being waited upon.

Another obvious systems possibility is the employment of several automatons in a series arrangement such that articles are passed along from a zone served by one automaton to a zone served by a succeeding automaton. Furthermore, it is possible, though not preferred, to provide for the passage of self-propelled manipulator assemblies from the automaton in a first zone to an automaton in a second zone, the automaton control system in the second zone then taking over control of the manipulator assembly. Such an arrangement may be convenient where there is a continuous processing of parts such as coating or the like, where it is inconvenient to have a manipulator put the part down and wait for another manipulator in the second zone to pick it up. The possible variations and combinations in the combining of two or more of the automatons in accordance with the present invention are almost unlimited.

A particularly important feature of the circuit of the preferred embodiment of the present invention is the economy of construction which is available by reason of the repeated use of the manipulation operation selection relays 110–119 for each step. Thus, these relays are cleared, either during, or after the completion of all of the manipulation operations for each step, and they are then available to be picked up to record the manipulation operations selected on the next succeeding step.

Another important feature of the invention which should be emphasized is the capability of the manipulator to position its grasping device in many different positions while the associated carriage is at a particular station. The combinations of positions involved are very large when it is realized that there may be a horizontal or vertical extension motion, and rotation in either a horizontal or vertical plane. Furthermore, while horizontal or vertical coordinates to these motions are most common, it is quite obvious that any selected angle may be chosen for these motions as convenience may dictate.

The combination of manipulation motions at each station, including rotation in various directions, provides the unique capacity in this system to reach the same identical position with the grasping device from two different adjacent stations.

It is believed to be obvious from the above disclosure that the present invention has provided all of the objects and advantages originally set forth in this specification. It is clear that the invention is particularly characterized by tremendous versatility and simplicity and economy.

While this invention has been shown and described in connection with preferred embodiments, it is apparent that various changes and modifications, in addition to those mentioned above, may be made by those who are skilled in the art without departing from the basic features of the invention. Accordingly, it is the intention of the applicant to protect all variations and modifications within the true spirit and valid scope of this invention.

I claim:

1. An automatic manipulation and positioning system comprising a manipulator translationally movable to a plurality of stations, means for operating the system in a series of steps, means for selecting one of said stations for each of said steps, means for selecting a separate combination of manipulation operations to be performed in sequence for each of said steps, said manipulation selection means being operable in response to the selection of at least one manipulation operation, a discrete station detector at each station and operable in response to the positioning of the manipulator at that station, control circuit means operable at each step in response to said selecting means to move said manipulator until it is stopped at the selected station, said control circuit means including means operable solely in response to the operation of the station detector of the selected station to stop the manipulator and then to operate the manipulator through each of the selected manipulation operations, and means for signalling the completion of said selected manipulation operations for each step to cause said control circuit means to proceed to the next step, said means for selecting one of said stations for each of said steps being operable to select any of said stations in any other, including the capability of selecting the same station repeatedly for successive steps, said control circuit means being operable to select any of said stations in any order, said manipulator in the shortest path to position it at the selected station and to move the manipulator in said determined direction, said control circuit means including a latching relay for each station, said latching relays each being operable to the latched position each time the associated station is selected for a particular step, and said station relays each being operable to remain latched until the direction of movement for said manipulator to the next selected station is determined, said direction determining circuit means including circuits associated with said station relays for routing an interrogation current from the station relay representing the presently selected station to detect whether or not the previously selected station represented by the previously latched station relay is positioned between the presently selected station and one end of the translational path of manipulator travel.

2. A system in accordance with claim 1 in which the direction of interrogation is always towards the nearest end of said path of travel.

3. A system in accordance with claim 2 including forward and reverse circuits arranged to be energized by said interrogation current, forward and reverse control relays connected for actuation in response to said forward and reverse circuits, each of said connections to said respective relays including normally closed interlock contacts of the other relay, limit switches and independent limit switch circuits connected thereto for actuation of said forward and reverse relays, and transfer contacts associated with said interlock contacts on each of said relays for transferring the current from said forward circuit to said reverse relay whenever the forward limit switch is closed to pick up said reverse relay, and for transferring said reverse circuit current to said forward relay whenever the reverse limit switch is closed to pick up said forward relay.

4. An automatic manipulation and positioning system comprising a manipulator translationally movable to a plurality of stations, means for operating the system in a series of steps, means for selecting one of said stations for each of said steps, means for selecting a separate combination of manipulation operations to be performed in sequence for each of said steps, said manipulation selection means being operable in response to the selection of at least one manipulation operation, a discrete station detector at each station and operable in response to the positioning of the manipulator at that station, control circuit means operable at each step in response to said selecting means to move said manipulator until it is stopped at the selected station, said control circuit means including means operable solely in response to the operation of the station detector of the selected station to stop the manipulator and then to operate the manipulator through each of the selected manipulation operations, said last named means including a two-state switching device for each manipulation operation which may be selected for each step, connections from said manipulation selection means for operating each of said switching devices corresponding to a selected manipulation, said control circuit means including switching circuits operable in response to the selected ones of said switching devices for carrying out the selected manipulations in sequence and for releasing said switching devices as the individual manipulations corresponding thereto are completed, and means operable to detect the release of all of said selected switching devices for signalling the completion of said selected manipulation operations for each step to cause said control circuit means to proceed to the next step.

5. A system in accordance with claim 4 in which said two-state switching devices are relays and said manipulation operations are selectable in any combination for each of said steps.

6. A system in accordance with claim 5 in which said manipulation selection relays each include a single manipulation control transfer contact lever and in which the normally closed sides of said transfer levers are connected in series cascade arrangement to conduct a manipulation action current immediately through an unselected manipulation relay, the normally open side of said manipulation control transfer contact lever for each of said manipulation relays being connected directly to control the particular manipulation action called for, said control circuit means including means for accomplishing the manipulation action and then de-energizing the manipulation selection relay which called for that manipulation to thereby transfer the manipulation action current onto the next manipulation selection relay to thereby provide for a simple sequential performance of the selected manipulation operations.

7. A system in accordance with claim 6 in which all of said manipulation operation selection relays are cleared for the operations completed at the end of a particular step so as to be ready to pick up in response to the manipulations selected for the next succeeding step.

8. A system in accordance with claim 4 in which a limit switch means is provided to determine the completion of a particular manipulation operation, said limit switch being connected in series in a holding circuit for the manipulation operation selection relay for that manipulation so as to de-energize said manipulation operation selection relay when the manipulation is completed and said limit switch is opened.

9. A system in accordance with claim 6 in which said cascade connected arrangement of normally closed contact levers of said manipulation operation selection relays is interrupted by a time delay circuit, said time delay circuit including a separate adjustable circuit element insertable in the time delay circuit for determining the time delay period on a separate basis for each step in the operation of the system.

10. A system in accordance with claim 4 in which one of said manipulation operations is a test operation, and in which a test manipulation operation selection relay is provided which is effective to interrupt the operation of the system until at least one of two test results is signaled, said system being operable to by-pass the first succeeding step in response to one of said test results, and to by-pass the second succeeding step in response to the other of said test results and to de-energize said test operation selection relay as soon as the by-pass operation is performed.

11. A system in accordance with claim 4 in which said control circuit means includes a multiple contact stepping relay having separate contacts connectable to said station selecting means and said manipulation operation selecting means for thereby initiating the station and manipulation movements of said manipulator.

12. A system in accordance with claim 8 in which said limit switch means is operable at an automatically variable position determined by engagement with an article being manipulated to indicate completion of the manipulation operation involving such engagement.

13. A system in accordance with claim 4 in which said manipulation operations include the operations of rotate clockwise and counterclockwise, extend, retract, grasp, and release.

14. A system in accordance with claim 13 in which said grasp operation is carried out by means of opposed mechanical jaws which engage opposite sides of an article to be manipulated.

15. A system in accordance with claim 13 in which said grasp operation is carried out by means of a vacuum pick up device.

16. A system in accordance with claim 15 in which a vacuum switch is provided to sense the change in vacuum when an article is picked up and to signal the completion of the pick up operation.

17. A system in accordance with claim 4 in which said manipulator comprises a manipulator assembly having separate sections mechanically connected in serial arrangement for accomplishing different manipulation functions, said sections being interchangeable and insertable to provide added functions as desired, and said manipulator assembly elements being easily replacable to accommodate for wear and for different manipulation requirements.

18. A system in accordance with claim 4 in which the manipulator is suspended from an overhead track and in which the operating components of said manipulator are primarily in simple tension during lifting and other manipulation operations.

References Cited

UNITED STATES PATENTS

| | | | |
|---|---|---|---|
| 1,905,229 | 4/1933 | James | 214—16 |
| 2,427,493 | 9/1947 | Bullard | 192—142 |
| 2,988,237 | 6/1961 | Devol | 214—16.4 |
| 3,272,347 | 9/1966 | Lemelson | 214—16.4 |

GERALD M. FORLENZA, *Primary Examiner.*

G. F. ABRAHAM, *Assistant Examiner.*

U.S. Cl. X.R.

214—16.4; 29—65, 38

UNITED STATES PATENT OFFICE
CERTIFICATE OF CORRECTION

Patent No. 3,422,967　　　　　　　　　　January 21, 1969

Peter A. Aron

It is certified that error appears in the above identified patent and that said Letters Patent are hereby corrected as shown below:

Column 25, line 6, "other" should read -- order --; line 9, "select any of said stations in any order" should read -- determine which direction to move --.

Signed and sealed this 7th day of April 1970.

(SEAL)
Attest:

Edward M. Fletcher, Jr.　　　　　　　WILLIAM E. SCHUYLER, JR.
Attesting Officer　　　　　　　　　　　　Commissioner of Patents